US011241854B2

(12) United States Patent
Waite et al.

(10) Patent No.: US 11,241,854 B2
(45) Date of Patent: *Feb. 8, 2022

(54) COMPACTOR SYSTEM AND RELATED BALING AND RECYCLING METHOD

(71) Applicant: BACE, LLC, Charlotte, NC (US)

(72) Inventors: Frederick Waite, Huntersville, NC (US); Drew Sigmund, Jr., Matthews, NC (US); Matthew Perry, Monroe, NC (US)

(73) Assignee: BACE, LLC, Charlotte, NC (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/692,232

(22) Filed: Nov. 22, 2019

(65) Prior Publication Data

US 2020/0164608 A1 May 28, 2020

Related U.S. Application Data

(63) Continuation of application No. 16/371,747, filed on Apr. 1, 2019, which is a continuation-in-part of (Continued)

(51) Int. Cl.
*B65B 13/20* (2006.01)
*G06Q 10/00* (2012.01)
(Continued)

(52) U.S. Cl.
CPC ........ *B30B 15/0094* (2013.01); *B30B 9/3007* (2013.01); *B30B 9/3046* (2013.01);
(Continued)

(58) Field of Classification Search
CPC ........ G01G 19/52; G01G 21/22; G01G 19/00; G01G 21/28; B65B 13/20; B30B 9/3007; G06Q 10/30; Y02W 90/00
See application file for complete search history.

(56) References Cited

U.S. PATENT DOCUMENTS 3,893,386 A * 7/1975 Wise ................ B30B 9/3042
100/50
4,742,880 A * 5/1988 Schrag ............. A01F 15/0875
177/136
(Continued)

FOREIGN PATENT DOCUMENTS

CA    2788515    2/2014
EP    0508753    10/1992
(Continued)

OTHER PUBLICATIONS

WasteCare Corporation, "60" Vertical Balers Comparison Chart, accessed by Web Archive on Aug. 13, 2010, 5 pages.
(Continued)

*Primary Examiner* — Randy W Gibson
(74) *Attorney, Agent, or Firm* — Gardner Groff & Greenwald, PC

(57) ABSTRACT

A recycling method includes the steps of compacting recyclable material into a fixed bale, and weighing the recyclable material, using load cells, independently of the compacting forces. Compacting equipment for performing the method includes balers with load cells and anchors, with the load cells weighing the baler and the recyclable material in the baler, and with the anchors anchoring the baler in place without interfering with the weighing.

20 Claims, 6 Drawing Sheets

Related U.S. Application Data application No. 13/690,574, filed on Nov. 30, 2012, now Pat. No. 10,377,518.

(51) Int. Cl.
| | |
|---|---|
| *B30B 9/30* | (2006.01) |
| *G01G 19/00* | (2006.01) |
| *G01G 19/52* | (2006.01) |
| *G01G 21/22* | (2006.01) |
| *B30B 15/00* | (2006.01) |
| *B30B 15/08* | (2006.01) |
| *B65F 1/14* | (2006.01) |
| *G06K 19/07* | (2006.01) |
| *B65F 9/00* | (2006.01) |
| *G01G 21/28* | (2006.01) |

(52) U.S. Cl.
CPC ............ *B30B 15/08* (2013.01); *B65F 1/1405* (2013.01); *B65F 1/1484* (2013.01); *G01G 19/00* (2013.01); *G01G 19/52* (2013.01); *G01G 21/22* (2013.01); *B65F 9/00* (2013.01); *G01G 21/28* (2013.01); *G06K 19/0723* (2013.01); *G06Q 10/30* (2013.01)

(56) References Cited

U.S. PATENT DOCUMENTS

| | | | | |
|---|---|---|---|---|
| 4,773,027 | A * | 9/1988 | Neumann | B30B 9/3007 |
| | | | | 100/229 A |
| 5,016,197 | A * | 5/1991 | Neumann | B30B 9/3007 |
| | | | | 702/188 |
| 5,174,198 | A * | 12/1992 | Bolstad | B65B 27/12 |
| | | | | 100/19 R |
| 5,350,493 | A * | 9/1994 | Nguyen | D21C 5/02 |
| | | | | 162/6 |
| 5,384,436 | A * | 1/1995 | Pritchard | A01F 15/0875 |
| | | | | 100/99 |
| 5,742,010 | A * | 4/1998 | Griffin | A01F 15/0875 |
| | | | | 177/145 |
| 6,360,186 | B1 * | 3/2002 | Durbin | B30B 9/3007 |
| | | | | 100/99 |
| 6,378,276 | B1 * | 4/2002 | Dorge | A01F 15/0833 |
| | | | | 53/502 |
| 7,146,294 | B1 * | 12/2006 | Waitkus, Jr. | B30B 9/3007 |
| | | | | 702/188 |
| 7,406,402 | B1 * | 7/2008 | Waitkus, Jr. | G06Q 10/08 |
| | | | | 702/188 |
| 7,957,937 | B2 | 6/2011 | Waitkus | |
| 2006/0080819 | A1 * | 4/2006 | McAllister | G06K 17/00 |
| | | | | 29/403.3 |
| 2007/0175341 | A1 * | 8/2007 | Roberts | A01F 15/08 |
| | | | | 100/102 |
| 2007/0185612 | A1 * | 8/2007 | Stevens | B30B 9/3007 |
| | | | | 700/215 |
| 2008/0061125 | A1 * | 3/2008 | Langlois | G06Q 50/28 |
| | | | | 235/376 |
| 2009/0235628 | A1 * | 9/2009 | Derstine | A01F 15/04 |
| | | | | 56/341 |
| 2010/0179912 | A1 | 7/2010 | Curotto | |
| 2012/0073456 | A1 | 3/2012 | Lyle et al. | |
| 2012/0152133 | A1 * | 6/2012 | Newsome, III | B30B 9/3057 |
| | | | | 100/35 |
| 2012/0285750 | A1 | 11/2012 | Hynes et al. | |
| 2014/0122347 | A1 * | 5/2014 | Moran | G06Q 10/30 |
| | | | | 705/308 |
| 2016/0356640 | A1 | 12/2016 | Freeman | |

FOREIGN PATENT DOCUMENTS

| | | |
|---|---|---|
| EP | 0967320 | 12/1999 |
| GB | 1507800 | 4/1978 |
| JP | 2000142657 | 5/2000 |
| KR | 100252464 | 4/2000 |
| WO | 2009044092 | 4/2009 |

OTHER PUBLICATIONS

Green Recycling, "Services—Recycling Card/Cardboard/OGG (Old Corrugated Cardboard)," accessed by WebArchive on Jun. 18, 2012, 4 pages.

Pandora Intelligent Networks <http://www.pandoraintelligentnetworks.com/about.aspx> Retrieved Mar. 18, 2019, 1 page.

Marathon Equipment Company, "RamJet Compactor Options," at least as early as Apr. 8, 2016, 8 pages.

* cited by examiner

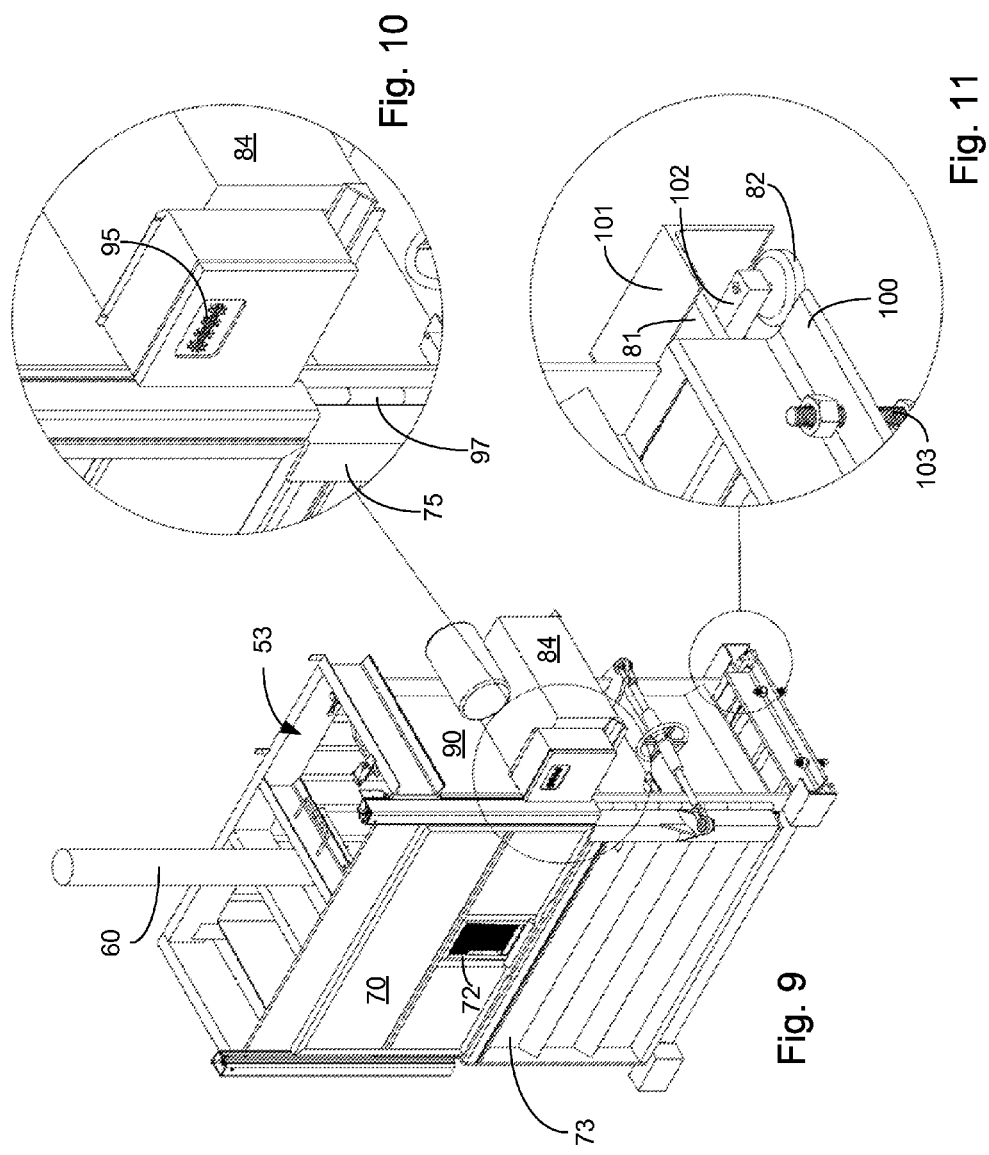

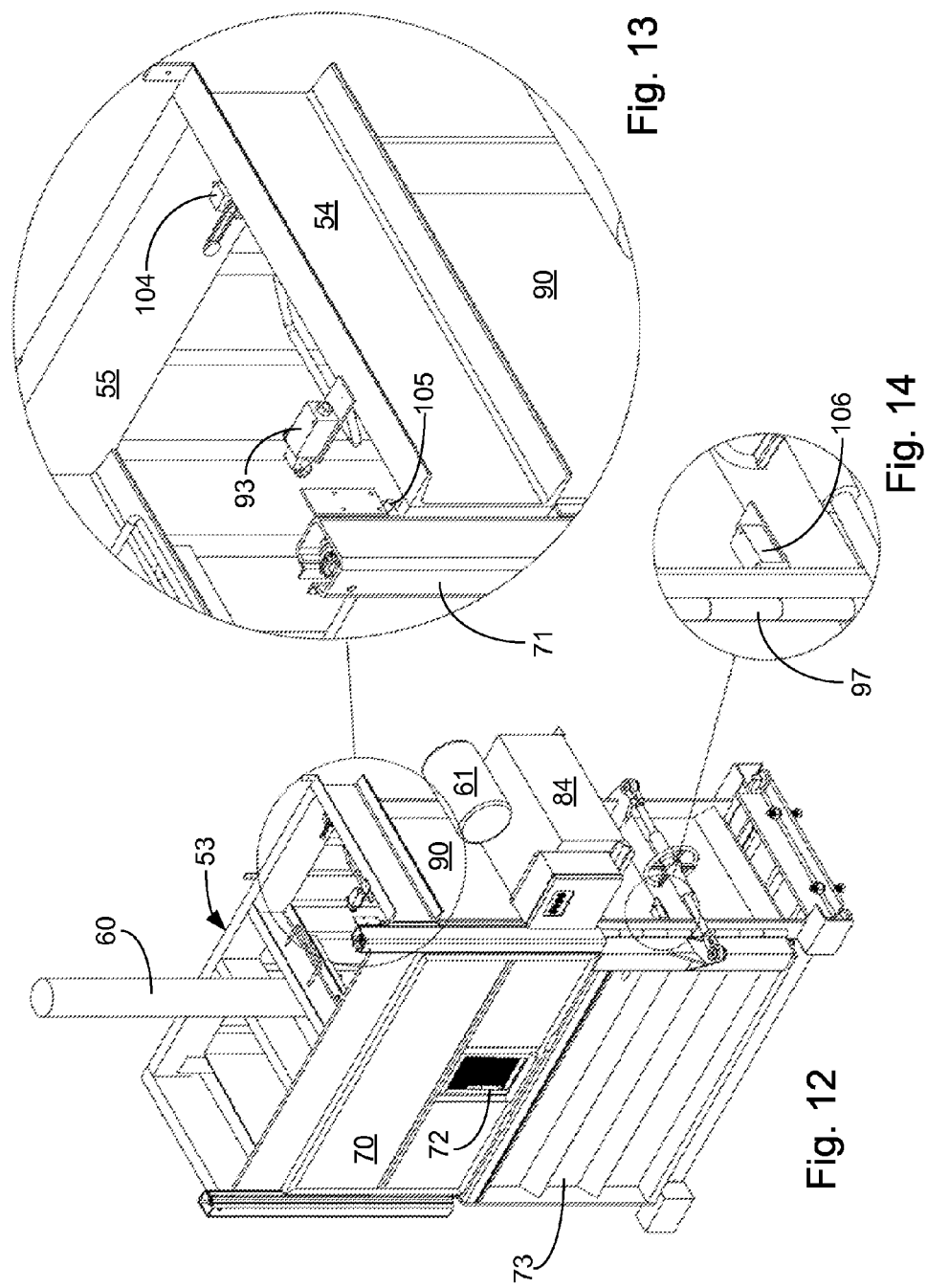

COMPACTOR SYSTEM AND RELATED BALING AND RECYCLING METHOD

CROSS-REFERENCE TO RELATED APPLICATIONS

This application is a continuation of U.S. Non-Provisional patent application Ser. No. 16/371,747, filed Apr. 1, 2019, which is a continuation-in-part of U.S. patent application Ser. No. 13/690,574, filed Nov. 30, 2012, now U.S. Pat. No. 10,377,518, issued Aug. 12, 2019, both of which are incorporated herein by reference.

TECHNICAL FIELD

The present invention relates generally to compacting and baling equipment for waste materials, and particularly to features of such equipment for weighing the contained waste materials for timely compacting and baling thereof.

BACKGROUND

The invention is an improvement in methods of recycling. Recycling is, of course, an activity rather than a composition per se. Thus, almost any item or material is "recyclable" in some fashion. That said, the most commonly recycled materials include old corrugated containers (OCC), paper, plastic, 10 and non-ferrous metals (e.g., aluminum). The invention relates to any (or all) of these materials.

As an exemplary material, and at recent prices, "used" cardboard is worth approximately US$100-150 per ton. This makes its collection and recycling economically viable. According to some statistics, about 30 million tons of OCC were recovered in the US in 2011; i.e., worth about US$3-4 Billion. Similar statistics exist for other recyclable materials.

OCC is of interest because commercially, a large percentage (70-90%) of goods is shipped in some form of corrugated containers. Because of that, discarded boxes at retail establishments (e.g., grocery stores and volume retailers) represent a significant amount of OCC. Typically, the discarded boxes are temporarily compacted and baled at the retailer and then hauled away by a commercial waste company to a recycling center. At the recycling center, the cardboard is pressed and wrapped (i.e., rebaled) into bales that are sized for particular requirements such as transport in containers (i.e., container ships, container trailers) or for the input stream of a paper recycling mill.

Generally, the retailer does not have the capability for such a finalized baling, but instead uses a simpler, but less precise, baler. Because of that, the retailer is at the mercy of the hauler or recycling company in terms of calculating the amount (weight) of the collected cardboard material and the price that the OCC should command. Indeed, in many cases the hauler simply reports an unverified weight to the retailer, a weight that the retailer has no means of confirming. Given that grocery store chains and other retailers can generate huge amounts of discarded cardboard—even within local geographic areas—the total weight can reach thousands of tons per year, that in turn represent millions of dollars. Accordingly, a retailer's (or a retail chain's) loss of even a small percentage of the value of the collected discarded cardboard represents a relatively large economic disadvantage.

Stated positively, a sufficient economic incentive already exists and thus, the reward for recycling OCC (or any other relevant material) is potentially significant.

As another factor, because OCC material must be hauled from retailers to recycling centers, transportation costs and regulations (e.g., weight limits for commercial vehicles) also become an economic factor. An under loaded (or inefficiently loaded) truck wastes fuel resources while overloaded ones create regulatory and legal problems. As a result, the lack of precise information about OCC bales costs the retailer significant amounts, wastes transportation resources (thus effectively increasing transportation costs) and potentially violates state and federal laws.

In particular, a significant amount of OCC (or other baled recyclable material) is, at some point, hauled in steel intermodal containers (also referred to as "shipping containers," "sea containers," and "ISO containers"). A variety of such containers exist, and a common size is 40 feet long, 8 feet wide and 8½ feet high. The maximum load for this size container is typically about 30,000 kg (about 66000 pounds; about 33 tons). As those in the shipping business are aware, however, the exact sizes and weight capacities (or allowances) can differ from container to container and in some cases from shipper to shipper.

Regardless of exact sizes, using containers in the most efficient fashion requires filling up the volume and carrying the maximum weight. Stated differently, a shipped container that is less than full (either by volume or by weight) represents an inefficient use of resources and a resulting excess cost.

Currently, compacted OCC bales that (i) have dimensions of about 58×30×45" and (ii) weigh about 1250 pounds, will fill a standard container most efficiently. In current practice, however, the retailer does not produce such bales and instead relies on the hauler or recycler to produce the desired bales for further shipment or use.

As a result, bales of consistent size and weight can have more value than bales of random size and weight, particularly when the bales are intended for container shipping or export or both. The retailer loses this value (or a fraction thereof) when the retailer produces an informal bale.

In a corresponding manner, informal bales will not fill a shipping container by volume, or by weight. Because of that, a container that is shipped at less than full capacity reduces efficiency and increases cost by a factor related to the percentage of unused space or weight.

SUMMARY

Accordingly, in one aspect, the invention is a combination of a baler (compactor), a scale that weighs the recyclable material in the compactor at any point from the loading step to the finished compacted bale and independently of the force applied to the bale by the compactor, an identification system, and one or more processors (computers) that will bale to a required size on site (i.e., at the retailer), that will concurrently weigh the bale, that will assign an identifier (e.g. a barcode or RFID) to the bale, and then provide the selling retailer (and potentially other parties) with a highly accurate inventory of discarded, baled, sold, and transported recyclable material.

In another aspect, the invention is a recycling system that is particularly suitable for old corrugated containers (OCC) generated at a retail location. The system includes a baler for baling multiple pieces of OCC into generally fixed bales, a scale in weighing communication with the baler for weighing baled OCC produced by the baler, an identification system for adding specific identification to each bale produced by the baler, and at least one processor in signal communication with the baler, the scale and the identification system.

In another aspect, the invention is a weighed, identified bale of recyclable material that is ready for immediate container shipment or for a mill.

In another aspect, the invention is a recycling method that includes the steps of compacting recyclable material in a compactor into a bale while concurrently weighing the material in the compactor and independently of the force that the compactor applies to the material or to the bale, assigning an individual identifier to each fixed bale in which the identifier includes at least the weight of the bale, and generating an inventory of the baled recyclable material.

In yet another aspect, the invention is a recycling method that is particularly suitable for old corrugated containers (OCC) generated at retailers, that includes the steps of baling OCC into a fixed bale of OCC, weighing the fixed bale, assigning an individual identifier to the fixed bale in which the identifier includes at least the weight of the bale, and sending the fixed bale to a destination selected from the group consisting of shippers and mills (recycling, paper).

The foregoing and other objects and advantages of the invention and the manner in which the same are accomplished will become clearer based on the followed detailed description taken in conjunction with the accompanying drawings.

BRIEF DESCRIPTION OF THE DRAWINGS

FIG. 9 is a perspective view similar to FIG. 3, and FIGS. 10 and 11 are enlarged cutouts of the indicated portions of FIG. 9.

FIG. 12 is another perspective view similar to FIGS. 3 and 9, with enlarged cutout portions that form FIGS. 13 and 14.

DETAILED DESCRIPTION OF EXAMPLE EMBODIMENTS

Figure 1:
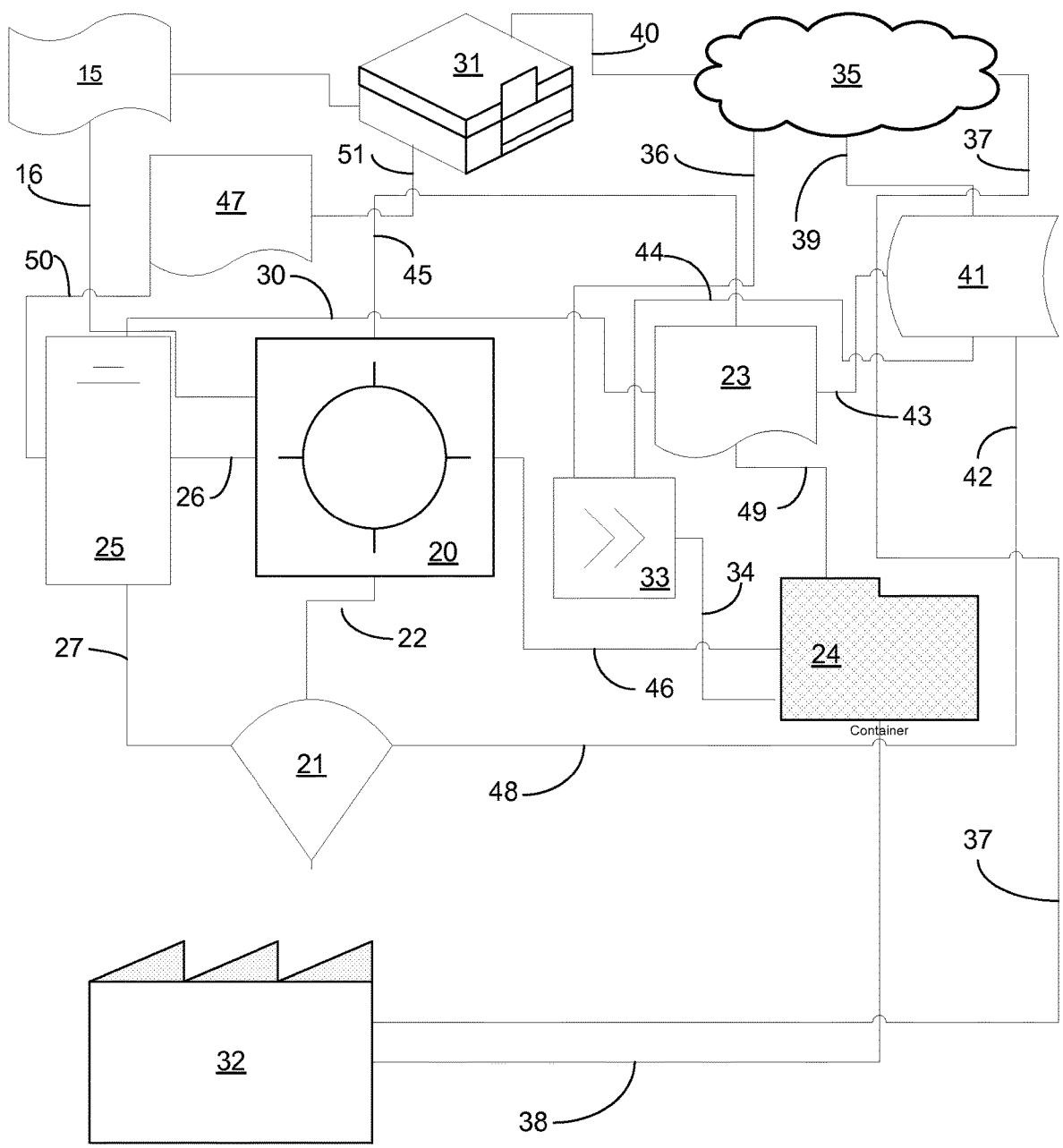
FIG. 1 is a flow diagram illustrating the method of the invention.

FIG. 1 is a schematic diagram illustrating various elements of the invention and the method of the invention. The invention is described in terms of old corrugated containers ("OCC") that are designated at 15 in the flowchart and that are placed or otherwise delivered to a baler 20.

As a point of nomenclature, a device that uses force (e.g., a press or a piston) to reduce the size of waste material such as OCC is typically referred to as a "compactor." In this specification, the terms "baler" and "compactor" are generally used interchangeably unless the context indicates a different us or distinction. "Baling" refers to the step— manual or automated—of wrapping the compacted waste material in some fashion that maintains its integrity for the most part as a geometric unit. Baling is typically carried out by wrapping the OCC with metal bands, or with high-strength polymer strips, or in some cases polymer wrap, or with some other appropriate material.

In the flowchart, the OCC 15 and the baler 20 are connected by the line 16. In actual practice this relationship can be as simple as having an operator deliver the OCC 15 to the baler 20, or the line 16 can represent a more sophisticated system (e.g. a conveyor) for delivering OCC to the baler 20. In the expected context of an individual retail location, it is likely that an operator will place the OCC 15 in the baler 20.

In most cases, the baling step is selected based upon the preference of the customer that will receive the bale. One typical technique is to hand wrap the compacted bale with 14 gage baling wire. This is typically available in precut lengths (e.g. 10 feet) and is sometimes covered with a protective plastic coating. A 14 gage wire can generally be tied by hand without significant difficulty.

In most circumstances, the compactor essentially forces the memory out of the materials such as plastic or cardboard during the compacting step. If the bale is tied relatively quickly after compacting, the return of the memory will cause the bale to expand against its tie and thus essentially tighten the bale.

In a first aspect, the method includes the step of baling the OCC 15 into a plurality of generally fixed bales of OCC and then weighing each bale. As will be described in somewhat more detail with respect to FIGS. 2-11, the baler includes a scale 21 that is in weight communication with the baler 20 for weighing the bale of OCC 15 produced by the baler 20.

The term "scale" is used broadly to describe any device that weighs the bale, including devices that weigh the bale "in progress." In the embodiments illustrated in FIGS. 2-11 the weighing is carried out by one or more load cells 82 that are under the baler (e.g., FIG. 11) and electronically connected to the processor 25 by the communication line 27.

Figure 2:
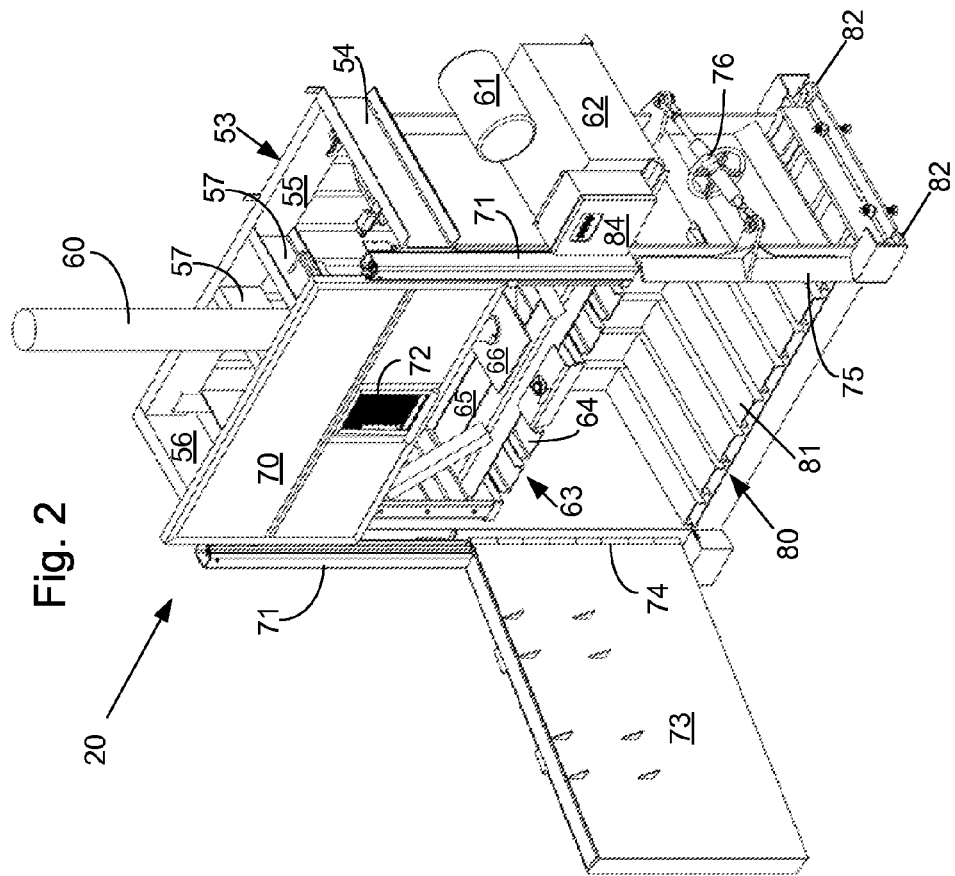

Because the load cells are under the baler (compactor), they can weigh the compactor and its contents while the compactor is compacting recyclable material and independently of the force that the compactor applies (e.g., cylinder 60, FIG. 2). Because the weight of the compactor 20 will generally remain constant, the difference in weight measured by the load cells will represent the weight of any added recyclable material.

An individual identifier is assigned to each fixed bale in which the identifier includes at least the weight of the bale from the scale 21. As will become clear from the further description herein, any identifier that can carry the required information and from which the required information can be reproduced or harvested is appropriate. In most current embodiments, the individual identifier will be some version of a radio frequency identification device ("RFID") or a machine readable label such as a barcode.

The term "barcode" is used in a broad sense and includes variation familiar to hose in the art such as "UPC," "EAN," and several others. In addition to individually naming (so to speak) a bale, these codes can include data about dates, measurements, locations, and many other types of information.

In FIG. 1, the identification system is indicated at 23 and an identified bale is indicated at 24. A processor 25 is in signal communication with the baler 20, with the scale 21, and with the identification system 23. Communication lines 26, 27 and 30 help illustrate these relationships. In the context of a plurality of bales, the method includes generating an inventory of the baled OCC material using the processor 25 and appropriate memory. The processor can be any appropriate device that has the calculating and memory sufficient to handle the steps of the invention. Typically, it includes a programmable logic controller (PLC) that can be programmed by the user. Many current types of PLC's can be programmed through a connection (e.g. Ethernet) to a personal computer and thus PLC's appropriate for the invention can be selected, programmed and used by those skilled in the art, and without undue experimentation.

In the method, the OCC is baled into a plurality of bales of similar fixed weight, or of similar geometry, or of both similar weight and similar geometry. Because of the nature of OCC, and of baling and recycling in general, the term "fixed weight" will be understood to include an appropriate tolerance or uncertainty rather than the level of precision that might be expected, for example, in bench top chemistry experiments. In some embodiments, the method comprises adding the OCC 15 to the baler 20 until the baler 20 and it's scale 21 detect a desired bale wait of OCC, and then producing a bale from that amount of OCC.

It will be understood, of course, that although the method is particularly advantageous for multiple bales and large amounts of OCC, the method also applies to a single bale.

In the same manner, the invention can include, either in conjunction with the weight or independently of it, baling 5 the OCC 15 into a plurality of bales of similar fixed shape. The most typical shape is a solid rectangle (again used generally with an understood tolerance) and an advantage of the invention is that it will produce the bale in a size and weight that is considered mill-ready. Although the term "mill-ready" is to some extent subjective, it is understood in the industry to represent a solid rectangle that weighs at least about 800 pounds, or in some cases at least 1000 pounds, and in many cases over 1200 pounds. Similarly, the bale will have dimensions on the order of about 60 inches on at least one of its sides (length width or height). As noted in the background, bales having dimensions of 58×30×45 inches (about 147×76×114 centimeters) are most efficiently-sized for filling typical shipping containers with little or no wasted space. Additionally, if such bales weigh about 1250 pounds (about 568 kilograms) each, they will match (or nearly match) the 30,480 kg (67,056 pound) weight limit. Using the maximum space and weight in turn maximizes the efficient use of a plurality of containers, including the most efficient use of energy to transport the containers and the proportionally lowest cost.

FIG. 1 also illustrates that one of the advantages of the invention is the use of the baler 20 at the site of the retailer 31 at which the OCC is being generated. As indicated in the background, the general advantage of the invention is to produce bales that can be transported to, and used at, a final destination without any rebaling step. FIG. 1 illustrates the destination as the mill (or buyer or shipper) 32, and the transportation to the mill 32 is indicated by the line 38. FIG. 1 is, of course, exemplary rather than limiting of the invention, and the destination is not limited by the terminology used herein.

In some circumstance, some (rather than all) of the bales are identified, labeled, and tracked. Stated differently, a method that bypasses one or a few bales from a plurality of bales still falls within the invention.

Furthermore, because the bales 24 carry the individual identifiers, the method can include reading the location of 45 the bales using the bales' individual identifiers after the bales leave the retail site. This step is illustrated in FIG. 1 by the detector 33. The detector 33 is appropriately complementary of or congruent with the type of identification used in the bale 24. Thus, if the bale is identified with an optical label such as a barcode, the detector 33 will be an optical scanning device that will recognize the barcode and interpret (and store and send) the information provided by the barcode.

Alternatively, if the identification system is RFID, the detector will either pick up the signal from the RFID or broadcast a signal to which the RFID responds. The relationship between the detector 33 and the identified bale 24 is indicated by the connecting line 34.

RFID devices are helpful because in most circumstances they eliminate the need for a data entry step. Their use and operation are generally well understood in the art and can be adopted by those of ordinary skill without undue experimentation. Some RFID tags are "passive" meaning that they have no internal power source, but draw power from the detector. Active tags contain a battery for power and some tags combine both passive and powered features. RFID tags have the advantage of not needing to be within the line of sight of a particular optical reader and thus can be embedded in the bales.

In order to provide the relevant information to the interested parties, the information from the detector 33 is sent to the retailer 31, the mill 32 or both. As illustrated in FIG. 1, this is most conveniently carried out using the Internet which in turn is symbolized by the cloud 35.

The use of the Internet 35 is, of course, convenient rather than mandatory, but the ubiquitous nature of the Internet and the ease of electronic communications make its use convenient and helpful. Connecting line 36 illustrates the flow of information from the detector 33 to the Internet 35 and line 37 similarly indicates the flow of information from the Internet to the mill 32. Line 40 indicates the flow of information from the Internet 35 to the retailer 31.

FIG. 1 also illustrates that the relevant identification data 41 is generated by the scale 21 and by the identification system 23. The data 41 arrives from (or its path is symbolized by) the scale 21 through the line 22 and with the identification system by the line 43. On a periodic basis, information and identification data are produced by the detector 33 as indicated by the line 44 connecting the detector 33 to the data 41.

In a similar manner, the relationship between the baler 20 and the identification system 23 is indicated by the line 45 and the relationship between the baler 20 and the identified bale 24 is indicated by the line 46. The relationship between the scale 21 and the identification data 41 is indicated by the line 42, and between the data 41 and the Internet 35 by the line 39. Line 49 represents the relationship between the bale 24 and the identification system 49.

FIG. 1 also shows that the processor 25 can also provide information 47 to the retailer early in the process, a relationship indicated by the connecting lines 50 and 51.

Although FIG. 1 illustrates several of these potential communication relationships, it will be understood that FIG. 1 is exemplary rather than limiting of this capability. Accordingly, the invention can include other paths of communication between and among the retailer, the bale, the mill, the transporter (shipper) and the Internet.

FIG. 2 is a perspective view of a baler 20 that includes aspects of the present invention. The baler 20 includes a frame broadly designated at 53 that is typically form of an appropriate metal, usually steel. The frame 53 has a number of structural elements such as the girders 54, 55, and 56 at the top. A pair of parallel reinforcing girders 57 helps support a main compaction cylinder 60 which is typically a hydraulic cylinder. The main compaction cylinder 60 is connected to hydraulic fluids through appropriate hydraulic lines (which have been omitted from FIG. 2 for clarity). The hydraulic cylinder includes a piston 94 (FIG. 6) driven by the motor 61 and obtains fluid from, and is controlled by, a tank and control housing 62.

The main compaction cylinder 60 is attached to a press head assembly broadly designated at 63. In the illustrated embodiment, the press head assembly is formed of a plurality of press head plates 64. These are connected to the main compaction cylinder 60 by the crosspiece 65 and the plate 66.

The compactor 20 includes a vertically oriented gate 70 that reciprocates vertically between two gate guide tube assemblies 71. The gate 70 includes a smaller portal 72 through which an operator can observe the status of the compaction and of any resulting bale. The gate 70 is typically raised in order to add OCC and lowered (closed) for the compacting step.

In order to remove the bale from the compactor 20, a door 73 is included in the lower half of the baler 20. The door 73 is mounted on a door hinge 74. When the compactor is in operation the door is closed (e.g., FIG. 3) and held in place by a door latch 75. The door latch 75 pivots on a hinge 97 (FIG. 14) and is in turn is opened and closed by the turnbuckle 76 which moves on its own hinge 77.

The floor of the baler 20 is broadly designated at 80 and in the illustrated embodiment is formed of a plurality of floor plates 81.

Although illustrated in more detail in FIG. 11, FIG. 2 also illustrates a pair of load cells 82. In the illustrated embodiment, a total of four load cells are positioned beneath the main frame 53 and are operatively connected to the controller and display 84.

Figure 3:
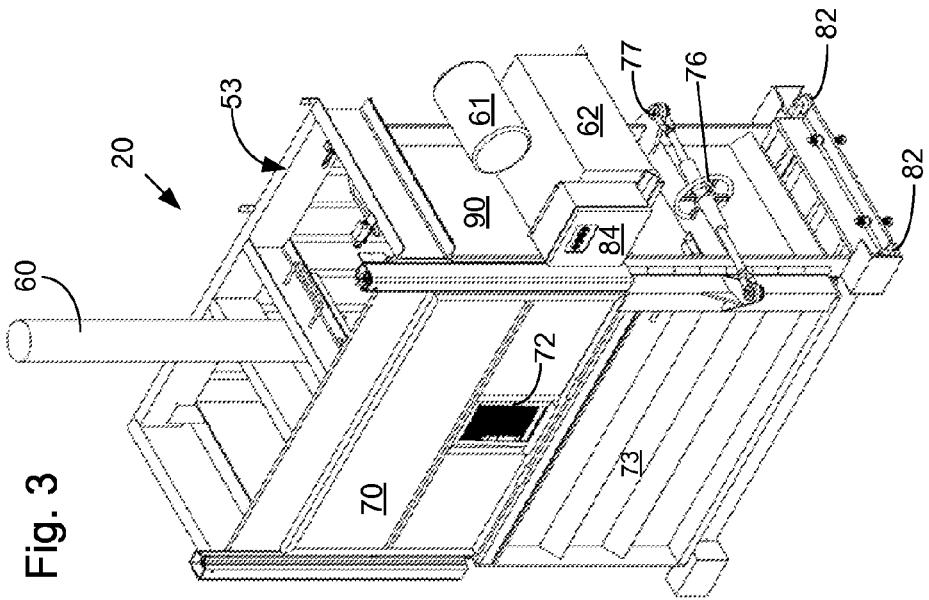
FIGS. 2 and 3 are perspective views of a baler according to the invention.

FIG. 3 illustrates the same baler 20 and thus the same structural and operational elements as FIG. 2, but with the gate 70 lowered and the door 73 closed and latched.

Figure 4:
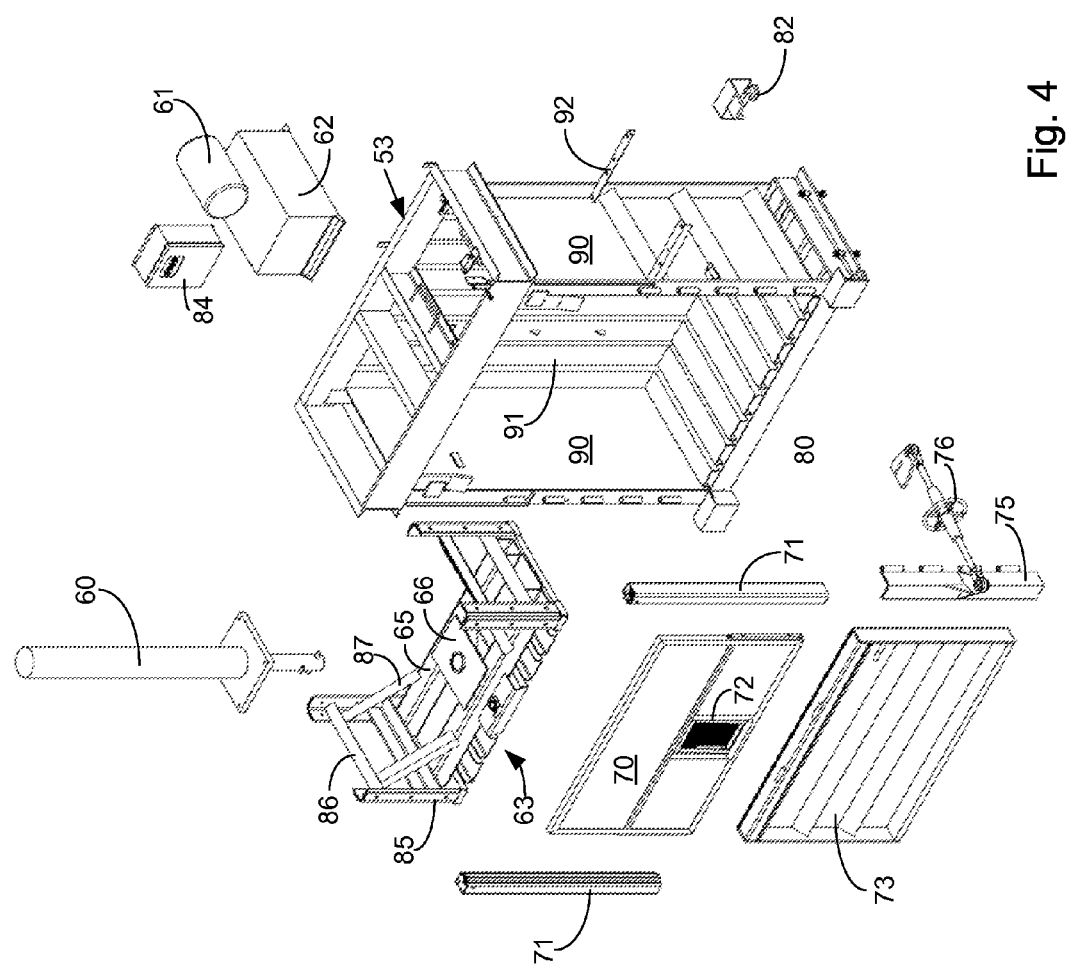
FIG. 4 is an exploded view of the perspective views of FIGS. 2 and 3.

FIG. 4 is an exploded view of the same baler 20 illustrated in FIGS. 2 and 3. Thus, the elements are the same, with FIG. 4 helping to illustrate a few more structural elements. FIG. 4 illustrates that in addition to the cross pieces 65 and the plate 66, the press head assembly 63 includes vertical bars 85 and horizontal bars 86 that are further joined and supported by the crossbars 87.

FIG. 4 also illustrates that the frame 53 includes side panels 90 and a rear panel 91. A pair of control support bars 92 extend from the side panel 90. FIG. 4 also illustrates a limit switch 93 (best seen in FIG. 13) that is typically one of several present for monitoring various positions of (for example) the press head assembly 63 as it reciprocates vertically.

Figure 7:
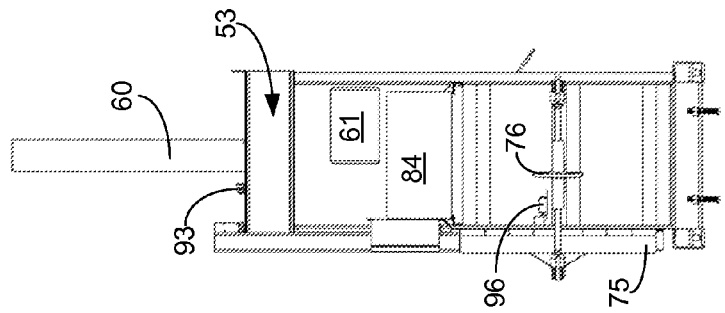
FIG. 7 is a side elevation overview of the baler according to the invention.
Figure 6:
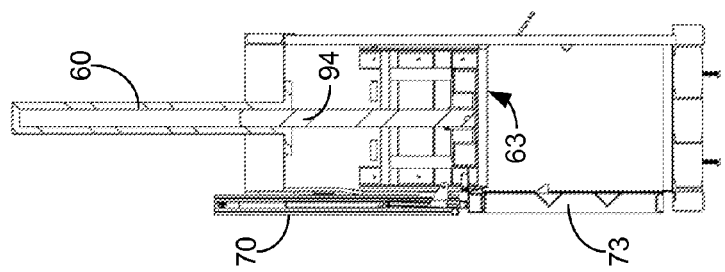
FIG. 6 is a cross-sectional view taken along lines A-A of FIG. 5.
Figure 8:
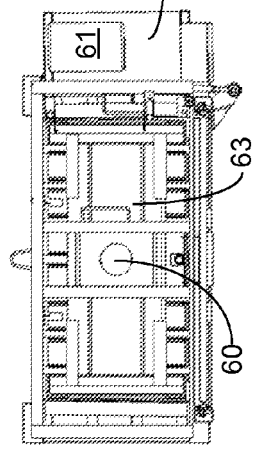
FIG. 8 is a top plan view of the baler of FIG. 5.
Figure 5:
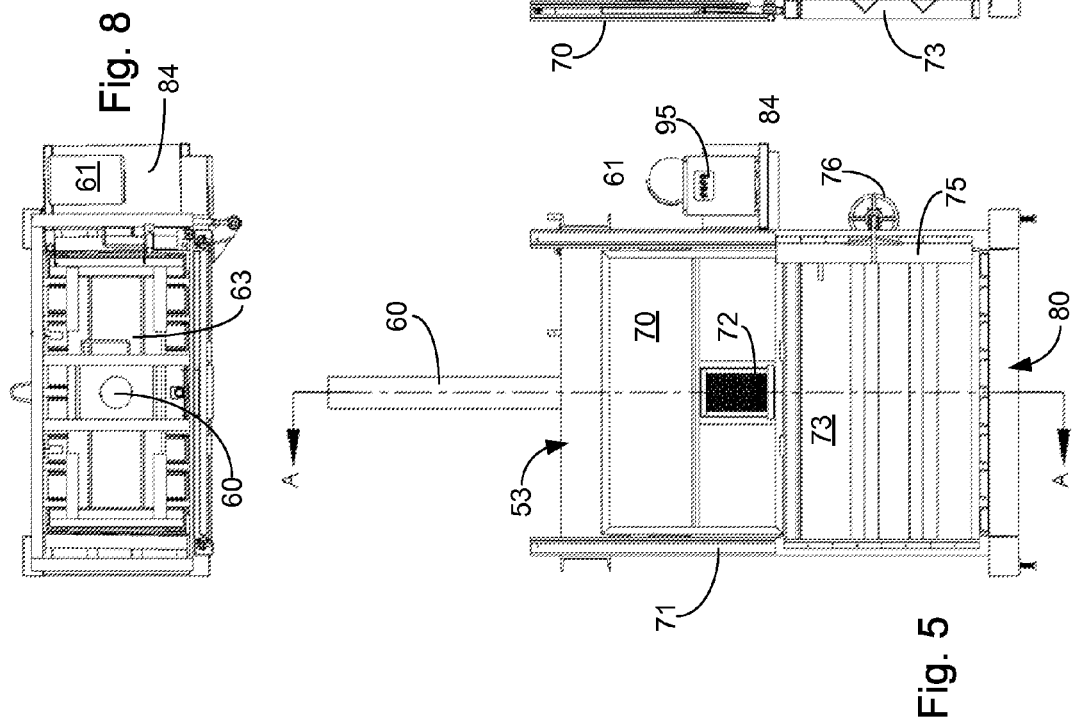
FIG. 5 is a front elevational view of a baler according to the invention.

FIGS. 5-8 are additional elevational, plan and cross-sectional views of the baler 20. These figures illustrate a number of items that have already been described, and thus they carry the same reference numerals. FIG. 6 illustrates that the main compaction cylinder 60 includes a piston 94 that reciprocates within the cylinder 60. FIG. 5 includes a somewhat clearer view of the digital display 95 on the controller 84. FIG. 7 illustrates another limit switch 96 positioned lower in the baler 20 than the limit switch 93 illustrated at the top.

FIG. 9 is identical to FIG. 3, but includes the cut out expanded views of FIGS. 10 and 11. FIG. 10 illustrates the controller 84 and its digital display 95. FIG. 10 also illustrates the hinge 97 for the door latch 75.

FIG. 11 shows the rear load cell 82 and its surrounding structure. The structure includes a side angle iron 100, a small portion of the floor plate 81, another angle iron 101 that serves as a load cell cover, and a load cell arm 102 that transfers force from the floor plate 81 to the load cell 82.

FIG. 11 also illustrates that the side angle iron 100 is fixed to several anchor bolts 103, two of which are visible in FIGS. 3 and 9. As the skilled person will recognize, both the weight of the baler and its reciprocating motion require that the baler be firmly anchored in place, and the anchor bolts 103 are thus typically fixed directly to a structural floor (or equivalent element) that can handle the forces generated when the baler is in operation.

FIGS. 12, 13, and 14 illustrate several other details. FIG. 12 is identical to FIG. 9 and FIG. 3. The enlarged view of FIG. 13 illustrates that the limit switch 93 is an up stop limit switch. FIG. 13 also illustrates a full bale limit switch 104 and a safety gate limit switch 105.

FIG. 14 illustrates a main bale door limit switch 106.

Using the invention, a retailer can produce and track a weighed, identified bale which is ready for immediate container shipment or for a mill. As an advantageous result, the retailer no longer needs an intermediate party to collect and resell (or recycle) the discarded cardboard. This in turn means that the retailer can collect more of the value per ton than has been previously available.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A recycling method for old corrugated containers (OCC) at retailers, the method comprising:
   compacting multiple pieces of discarded OCC in a compactor at a retail site into a fixed bale of OCC at that retail site, wherein the fixed bale is a solid rectangle;
   weighing the compactor and the OCC in the compactor independently of the force that the compactor applies to the discarded OCC or to the fixed bale during compacting;
   assigning an individual identifier to the fixed bale in which the identifier includes at least the weight of the fixed identified bale; and
   sending the fixed identified bale in an intermodal container from the retail site to a destination without any rebaling step,
wherein at least one load cell is positioned under the compactor to support the weight of the compactor and the discarded OCC during the compacting step and during the weighing step in order to perform the weighing step, and wherein an anchoring element anchors the compactor in place without interfering with the support of the weight of the compactor and the discarded OCC by the at least one load cell during the weighing by the at least one load cell.

2. The recycling method according to claim 1, wherein the step of compacting the discarded OCC further comprises adding the OCC to the compactor at the retail site while the compactor weighs the discarded OCC in the compactor until the compactor detects that a predetermined mill-ready weight of OCC has been added to the compactor, and then automatically initiating the compacting of the discarded OCC to produce the fixed bale from that OCC currently in the compactor, wherein the compacting, weighing, and assigning steps are repeated to produce a plurality of the fixed identified bales each having the same weight, and wherein the sending step includes sending the plurality of fixed, same-weight, identified bales in a container from the retail site to the destination, without any rebaling step, thereby optimizing transport to the destination.

3. The recycling method according to claim 1, further comprising obtaining location information of the transported bale by reading the bale's individual identifier and sending the location information to the destination.

4. The recycling method according to claim 1, wherein the destination is selected from the group consisting of a shipper, a mill, a rebaler, and a customer for the baled OCC.

5. A fixed identified bale produced according to the recycling method of claim 1.

6. A compacting system for a recyclable material, comprising:
   a compactor with a press head that reciprocates under a compacting force to compact the recyclable material into a fixed bale having a generally rectangular shape;
   at least one scale that weighs the combination of the compactor and the recyclable material in the compactor independently of the compacting force applied to the recyclable material by the compactor press head, wherein the at least one scale is positioned under the compactor to support the weight of the compactor and the recyclable material during the reciprocating operation of the compactor press head and during the weighing of the compactor and the recyclable material by the at least one scale; and
   at least one anchoring system including an anchor element that is configured to anchor the compactor in place during the reciprocating operation of the compactor press head without the anchoring system interfering with the support of the weight of the compactor and the recyclable material by the at least one scale during the weighing by the at least one scale.

7. The compacting system of claim 6, wherein the anchoring system further includes a retainer element that cooperates with the anchor element to anchor the compactor during the reciprocating operation of the compactor press head without interfering with the supporting and weighing of the compactor and the recyclable material by the at least one scale.

8. The compacting system of claim 6, wherein the retainer element is positioned a distance above and spaced apart from a cooperating portion of the compactor.

9. The compacting system of claim 7, wherein the anchor element is a bolt and the retainer element is a nut threaded onto the bolt but not tightened down into contact with the compactor or the at least one scale.

10. The compacting system of claim 6, wherein the scale includes at least one load cell.

11. The compacting system of claim 6, wherein the recyclable material is old corrugated containers (OCC).

12. The compacting system of claim 6, wherein the compactor is a baler.

13. The compacting system of claim 6, wherein the scale weighs the recyclable material in the compactor at any point from when the recyclable material is loaded into the compactor to when the fixed bale is finished.

14. The compacting system of claim 6, further comprising:
   an identification system configured to add specific identification to each fixed bale produced by the compactor; and
   at least one processor in signal communication with the compactor, the scale, and the identification system.

15. A fixed identified bale produced by the compacting system of claim 6.

16. A system for compacting old corrugated containers (OCC), comprising:
   a baler with a press head that reciprocates under a compacting force to compact the OCC into a fixed bale having a generally rectangular shape;
   at least one load cell that weighs the combination of the baler and the OCC in the baler independently of the compacting force applied to the OCC by the baler, wherein the at least one load cell is positioned under the baler to support the weight of the baler and the OCC during the reciprocating operation of the baler press head and during the weighing of the baler and the OCC by the at least one load cell; and
   at least one means for anchoring the baler in place during the reciprocating operation of the baler press head without interfering with the support of the weight of the baler and the OCC by the at least one load cell during the weighing by the at least one load cell.

17. The compacting system of claim 16, wherein the load cell weighs the OCC in the baler at any point from when the OCC is loaded into the baler to when the fixed bale is finished.

18. The compacting system of claim 16, further comprising:
   an identification system configured to add specific identification to each fixed bale produced by the baler; and
   at least one processor in signal communication with the baler, the scale, and the identification system.

19. The compacting system of claim 6, wherein the anchoring system further includes a retainer element that cooperates with the anchor element to anchor the compactor during the reciprocating operation of the compactor press head without interfering with the supporting and weighing of the compactor and the recyclable material by the at least one scale, wherein the compactor includes a base frame element, the anchor element anchors the base frame element in place, and the retainer element is positioned a distance above and spaced apart from the anchored base frame element of the compactor.

20. The compacting system of claim 6, wherein the at least one scale weighs the combination of the compactor and the recyclable material in the compactor concurrently during the reciprocating operation of the compactor press head, and wherein the anchor element is configured to anchor the compactor in place during the reciprocating operation of the compactor press head without the anchoring system interfering with the support of the weight of the compactor and the recyclable material by the at least one scale during the concurrent weighing by the at least one scale.

* * * * *